(12) United States Patent
Kakutani

(10) Patent No.: US 8,416,457 B2
(45) Date of Patent: Apr. 9, 2013

(54) PRINTING APPARATUS, PRINTING DATA GENERATING APPARATUS, PRINTING METHOD AND PROGRAM THEREOF

(75) Inventor: Toshiaki Kakutani, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 461 days.

(21) Appl. No.: 12/831,026

(22) Filed: Jul. 6, 2010

(65) Prior Publication Data

US 2011/0063684 A1 Mar. 17, 2011

(30) Foreign Application Priority Data

Sep. 16, 2009 (JP) .................................. 2009-214232

(51) Int. Cl.
*H04N 1/40* (2006.01)
(52) U.S. Cl. ...................................... 358/3.03; 358/3.05
(58) Field of Classification Search .................. 358/1.9, 358/3.04, 3.05, 3.03, 3.06; 382/252, 274
See application file for complete search history.

(56) References Cited

U.S. PATENT DOCUMENTS

| | | | |
|---|---|---|---|
| 6,977,757 B1 | 12/2005 | Takahashi et al. | |
| 7,431,413 B2 | 10/2008 | Mizutani et al. | |
| 7,474,443 B2 | 1/2009 | Mizutani et al. | |
| 2002/0051210 A1* | 5/2002 | Ostromoukhov | 358/3.05 |
| 2005/0231446 A1* | 10/2005 | Lee et al. | 345/63 |
| 2005/0259884 A1* | 11/2005 | Murakami et al. | 382/252 |
| 2006/0193010 A1 | 8/2006 | Kakutani | |
| 2007/0133060 A1* | 6/2007 | Cittadini et al. | 358/3.06 |
| 2008/0259361 A1 | 10/2008 | Kakutani | |
| 2009/0244632 A1* | 10/2009 | Yoshimura | 358/3.06 |
| 2010/0129004 A1* | 5/2010 | Ogawa | 382/274 |
| 2012/0182586 A1* | 7/2012 | Harayama | 358/3.03 |

FOREIGN PATENT DOCUMENTS

| | | |
|---|---|---|
| JP | 2001-177722 A | 6/2001 |
| JP | 2001-352448 A | 12/2001 |
| JP | 2006-67347 A | 3/2006 |
| JP | 2006-140579 A | 6/2006 |
| JP | 2007-15359 A | 1/2007 |
| JP | 2008-87381 A | 4/2008 |
| JP | 2008-87382 A | 4/2008 |

\* cited by examiner

*Primary Examiner* — Jerome Grant, II
(74) *Attorney, Agent, or Firm* — Global IP Counselors, LLP

(57) ABSTRACT

A printing apparatus is adapted to perform printing of image data corresponding to a plurality of pixels representing a predetermined image. The printing apparatus includes a halftone processing section including a comparison section and an error diffusion section. The comparison section is configured to compare, for at least one of the pixels, a related grayscale value relating to a data grayscale value of the input image data with a corresponding one of a plurality of thresholds included in a dither mask. The error diffusion section is configured to generate dot data for indicating the presence or absence of formation of a dot in each of the pixels according to an error diffusion method, on the basis of the data grayscale values of the input image data, and to control the easiness of the dot formation according to the error diffusion method, on the basis of a comparison result of the comparison section.

16 Claims, 9 Drawing Sheets

PRINTING APPARATUS, PRINTING DATA GENERATING APPARATUS, PRINTING METHOD AND PROGRAM THEREOF

CROSS-REFERENCE TO RELATED APPLICATIONS

This application claims priority to Japanese Patent Application No. 2009-214232 filed on Sep. 16, 2009. The entire disclosure of Japanese Patent Application No. 2009-214232 is hereby incorporated herein by reference.

BACKGROUND

1. Technical Field

The present invention relates to a printing technology which performs printing of image data for representing a predetermined image, and more particularly, to a halftone processing technique.

2. Related Art

In a printing apparatus, there is well known a dithering method or an error diffusion method as a halftone technique for performing a grayscale expression. Since the dithering method and the error diffusion method each have advantages and disadvantages, there has been in the related art a demand to combine the dithering method elements with the error diffusion method elements to perform the halftone process. For example, in JP-A-2001-352448 and JP-A-2001-177722 is disclosed a technique in which a threshold is periodically varied by applying a systematic dither mask of the dithering method to the threshold of the error diffusion method, so as to combine the dithering method element with the error diffusion method element to perform the halftone process.

SUMMARY

In the technique disclosed in JP-A-2001-352448 and JP-A-2001-177722, it is difficult to control the contribution level of the dithering method element and the error diffusion method element according to characteristics of printing image data which is a target of the halftone process. For example, it is difficult to control the contribution level, and further to smoothly change the contribution level according to an input grayscale value.

Based on at least one part of the above problem, one aspect of the invention provides a halftone processing technique which employs a combination of a dithering method element and an error diffusion method element in a different manner from the related art.

According to a first aspect of the invention, a printing apparatus is adapted to perform printing of image data corresponding to a plurality of pixels representing a predetermined image. The printing apparatus includes an input section, a halftone processing section, and a printing section. The input section is a section through which the image data including data grayscale values of the pixels is input. The halftone processing section is configured to generate dot data for indicating the presence or absence of formation of a dot in each of the pixels, on the basis of the image data. The printing section is configured to perform the printing of the image using the generated dot data. The halftone processing section includes a comparison section and an error diffusion section. The comparison section is configured to compare, for at least one of the pixels, a related grayscale value relating to the data grayscale value of the input image data with a corresponding one of a plurality of thresholds included in a dither mask. The error diffusion section is configured to generate the dot data according to an error diffusion method, on the basis of the data grayscale values of the input image data. The error diffusion section is configured to control the easiness of the dot formation according to the error diffusion method, on the basis of a comparison result of the comparison section.

In the printing apparatus with such a configuration, the easiness of the dot formation by means of the error diffusion method is controlled using the comparison result between the dither mask and the related grayscale value when the dot data is generated by means of the error diffusion method. That is, the easiness of the dot formation by means of the error diffusion method is controlled using a determination result about the presence or absence of the dot formation if the dithering method is employed. Accordingly, a halftone process can be achieved using the dithering method element and the error diffusion method element. In this respect, the data grayscale value includes a grayscale value of a recording rate which is a rate in which dots are recorded in pixels in an arbitrary region, in addition to the grayscale value itself of the image data. Further, the related grayscale value includes a grayscale value which is obtained by increasing or decreasing the data grayscale value by a predetermined value, in addition to the data grayscale value.

According to a second aspect of the invention, in the printing apparatus according to the first aspect, the error diffusion section is preferably configured to control the easiness of the dot formation so that the dot formation according to the error diffusion method is easier to occur in a case where the related grayscale value is equal to or larger than the corresponding one of the thresholds of the dither mask than in a case where the related grayscale value is smaller than the corresponding one of the thresholds of the dither mask.

In the printing apparatus with such a configuration, the control is performed so that the dots are easy to be formed by means of the error diffusion method in a case where it is determined that the dots are to be formed if using the dithering method, and is performed so that the dots are hard to be formed by means of the error diffusion method in a case where it is determined that the dots are not to be formed using the dithering method. Under any control, since the presence or absence of the dot formation becomes close to a result by means of the dithering method, the dithering method element is strong, compared with dot data by means of a simple error diffusion method. Accordingly, a halftone process can be achieved using the dithering method element and the error diffusion method element. Further, as the control level for the easiness of the dot formation is appropriately set, it is possible to set the contribution level of the dithering method element and the error diffusion method element in the halftone process at a desired level.

According to a third aspect of the invention, in the printing apparatus according to the second aspect, the error diffusion section is preferably configured to vary an error diffusion method threshold used to determine the presence or absence of the dot formation in the error diffusion method to control the easiness of the dot formation according to the error diffusion method.

In the printing apparatus with such a configuration, the easiness of the dot formation by means of the error diffusion method can be controlled with such a simple configuration in which the error diffusion method threshold is varied.

According to a fourth aspect of the invention, in the printing apparatus according to the second or third aspect, the error diffusion section is preferably configured to vary a control level for the easiness of the dot formation on the basis of the size of the data grayscale value.

In the printing apparatus with such a configuration, since the control level for the easiness of the dot formation is varied on the basis of the size of the data grayscale value, it is possible to vary the contribution level of the dithering method element and the error diffusion method element according to the grayscale value of the image data. Further, such a contribution level can be varied for every arbitrary region of the image data. As a result, it is possible to generate dot data having a preferable contribution level according to the characteristics of the image data and the printing apparatus, and to improve the printing image quality.

According to a fifth aspect of the invention, in the printing apparatus according to the fourth aspect, the error diffusion section is preferably configured to increase the control level for the easiness of the dot formation with respect to high grayscale data which is within a predetermined range in which the data grayscale value is relatively large, among the image data, compared with low grayscale data which is within a predetermined range in which the data grayscale value is relatively small.

In the printing apparatus with such a configuration, as the control level for the easiness of the dot formation is increased with respect to the high grayscale data compared with the low grayscale data, the dithering method element can become strong in the high grayscale side compared with the low grayscale side. Accordingly, it is possible to achieve advantages of the error diffusion method element on the low grayscale side, and to achieve advantages of the dithering method element on the high grayscale side. That is, printing can be achieved with the advantages of both of the error diffusion method and the dithering method.

According to a sixth aspect of the invention, in the printing apparatus according to the fourth or fifth aspect, the error diffusion section is preferably configured to vary by stages the control level for the easiness of the dot formation according to the size of the data grayscale value.

In the printing apparatus with such a configuration, since the control level for the easiness of the dot formation is varied by stages on the basis of the size of the data grayscale value, it is possible to smoothly vary the contribution level of the dithering method element and the error diffusion method element according to the data grayscale value. As a result, the variation in the contribution level of the dithering method element and the error diffusion method element is hardly visualized in a printing result, and thus, deterioration in the printing image quality due to the variation in the dithering method element and the error diffusion method element can be restricted.

According to a seventh aspect of the invention, in the printing apparatus according to any one of the fourth to sixth aspects, the error diffusion section is preferably configured to control the easiness of the dot formation so that the control level for the easiness of the dot formation increases as the data grayscale value increases at least when the data grayscale value is within a predetermined part of the entire range of the data grayscale value.

In the printing apparatus with such a configuration, the dithering method element can become strong as the grayscale value is increased in a range of at least part of the data grayscale value. Accordingly, in the corresponding range, it is possible to achieve the advantage of the error diffusion method element on the low grayscale side, and to achieve the advantage of the dithering method element on the high grayscale side. That is, printing can be achieved with the advantages of both of the error diffusion method element and the dithering method element. Further, since the control level for the easiness of the dot formation is increased as the data grayscale value is increased, it is possible to smoothly vary the contribution level of the dithering method element and the error diffusion method element according to the data grayscale value.

According to an eighth aspect of the invention, in the printing apparatus according to any one of the fourth to seventh aspects, the error diffusion section is preferably configured to stop the control for the easiness of the dot formation in a case where the data grayscale value is within a first range.

In the printing apparatus with such a configuration, since the control for the easiness of the dot formation by means of the error diffusion method is not performed in a case where the data grayscale value is within the first range, it is possible to form the dot data by means of only the error diffusion method element. Accordingly, in a case where there is a grayscale range in which the printing image quality is improved by forming the dot data by means of only the error diffusion method element, it is possible to generate dot data having a preferable printing image quality in the corresponding range.

According to a ninth aspect of the invention, in the printing apparatus according to any one of the fourth to eighth aspects, the halftone processing section is preferably configured to stop the generation of the dot data according to the error diffusion method and to generate the dot data according to a dithering method using the comparison result of the comparison section, in a case where the data grayscale value is within a second range.

In the printing apparatus with such a configuration, in the case where the data grayscale value is within the second range, since the generation of the dot data by means of the error diffusion method is stopped and the dot data is generated by means of the dithering method, it is possible to generate the dot data by means of only the dithering method element. Accordingly, in a case where there is a grayscale range in which the printing image quality is improved by forming the dot data by means of only the dithering method element, it is possible to generate dot data having a preferable printing image quality in the corresponding range. Further, since there is no need to calculate the diffusion error in the dithering method, unlike the error diffusion method, the halftone process can be performed at a high speed.

According to a tenth aspect of the invention, in the printing apparatus according to the ninth aspect, the second range is preferably a range having a relatively high data grayscale value in a case where the entire range of the data grayscale value is divided into two ranges.

In the printing apparatus with such a configuration, the dot data is generated by means of only the dithering method element in the range having the relatively high data grayscale value. From the viewpoint of the granularity of the printing image quality, the error diffusion method is superior to the dithering method. However, since the granularity of the printing image quality is hardly distinguished on the high grayscale side, even though the dot data is generated by means of only the dithering method element, deterioration in the granularity can be restricted. Accordingly, the halftone process can be performed at a high speed while restricting deterioration in the printing image quality.

According to an eleventh aspect of the invention, in the printing apparatus according to any one of the second to tenth aspects, the related grayscale value is preferably equal to the data grayscale value.

In the printing apparatus with such a configuration, since the related grayscale value is a grayscale value of the input image data, there is no need to perform a separate operation for calculating the related grayscale value. Accordingly, the halftone process can be performed with a simplified configuration at a high speed.

According to a twelfth aspect of the invention, in the printing apparatus according to any one of the second to tenth aspects, the related grayscale value preferably includes a grayscale value obtained by increasing or decreasing the data grayscale value by a predetermined positive value.

In the printing apparatus with such a configuration, the related grayscale value may be the grayscale value which is obtained by increasing or decreasing the grayscale value of the input image data by the predetermined value. Accordingly, it is possible to control the comparison result of the comparison section, and thus, it is possible to control the level of reflection of a dot generation pattern provided in the dither mask. As a result, it is possible to more smoothly control the contribution level of the dithering method element and the error diffusion method element.

According to a thirteenth aspect of the invention, in the printing apparatus according to the twelfth aspect, the related grayscale value is preferably a grayscale value obtained by increasing the data grayscale value by the predetermined positive value, and the error diffusion section is preferably configured to control the easiness of the dot formation in a case where the related grayscale value is smaller than the corresponding one of the thresholds of the dither mask as the comparison result of the comparison section, so that the dot formation is hard to occur or does not occur.

In the printing apparatus with such a configuration, as the related grayscale value becomes the grayscale value which is increased by the predetermined positive value, a case where the related grayscale value is equal to or larger than the threshold of the dither mask (referred to as a first case) as the comparison result of the comparison section frequently occurs, compared with the case where the related grayscale value is the data grayscale value. In the first case, the control is performed so that the dot formation is easy to occur by means of the error diffusion method. On the other hand, in the printing apparatus, in the case where the related grayscale value is smaller than the threshold of the dither mask (referred to as a second case) as the comparison result of the comparison section, the control is performed so that the dot formation is hard to occur or does not occur by means of the error diffusion method. Accordingly, it is highly likely that pixels in which the dots are to be formed are determined among pixels which belong to the first case, and it is possible to generate dot data which is close to the dot generation pattern provided in the dither mask. Further, in the second case, if the control is performed so that the dot formation does not occur, the pixels in which the dots are to be formed are necessarily determined among the pixels which belong to the first case. Accordingly, it is possible to generate the dot data which is closer to the dot generation pattern provided in the dither mask.

According to a fourteenth aspect of the invention, in the printing apparatus according to any one of the first to thirteenth aspects, the dither mask preferably has a blue noise characteristic.

In the printing apparatus with such a configuration, the dither mask may have a blue noise characteristic. Thus, it is possible to employ the dithering method element which is excellent in the granularity of the printing image quality in the halftone process. Further, since the dithering method element becomes excellent in the granularity of the printing image quality by means of the blue noise characteristic, it is possible to smoothly vary the contribution level of the dithering method element with respect to the error diffusion method element which is similarly excellent in the granularity of the printing image quality.

Further, in addition to the configuration of the printing apparatus, the invention may be applied to a printing data generating apparatus, a printing method used in the printing apparatus, a printing program, a computer usable medium which stores the program therein, and so on.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

A first embodiment of the invention will be described hereinafter.

A-1. Configuration of Apparatus

Figure 1:
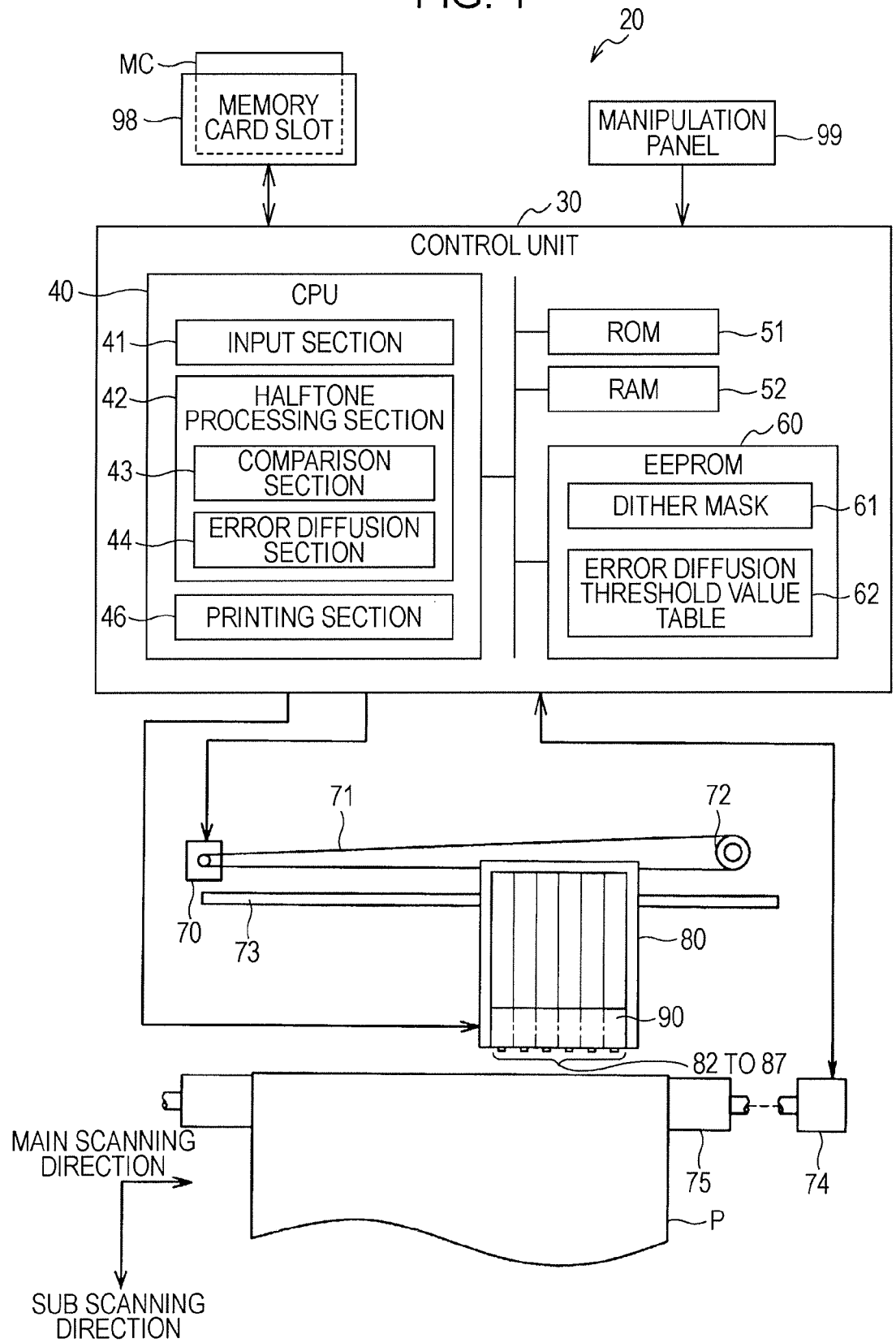
FIG. 1 is a diagram schematically illustrating a configuration of a printer according to a first embodiment of the present invention.

FIG. 1 is a diagram schematically illustrating a printer 20 according to a first embodiment of the invention. The printer 20 is a serial type ink jet printer which performs bidirectional printing. As shown in FIG. 1, the printer 20 includes a mechanism for transporting a printing medium P by means of a paper feeding motor 74; a mechanism for reciprocally moving a carriage 80 in an axial direction of a platen 75 by means of a carriage motor 70; a mechanism for driving a print head 90 which is mounted on the carriage 80 to perform ink ejection and dot formation; and a control unit 30 which performs communicating signals with respect to the paper feeding motor 74, the carriage motor 70, the print head 90 and a manipulation panel 99.

The mechanism for reciprocally moving the carriage 80 in the axial direction of the platen 75 includes a sliding shaft 73 which is installed in parallel with the axis of the platen 75 and holds the carriage 80 to be able to slide, a pulley 72 which has an endless driving belt 71 extended between the carriage motor 70 and the pulley 72, and so on.

Ink cartridges 82 to 87 for color ink which contains cyan ink C, magenta ink M, yellow ink Y, black ink K, light cyan ink Lc and light magenta ink Lm, respectively, are mounted to the carriage 80. A nozzle array corresponding to the color ink of the respective colors is arranged in the print head 90 which is provided at a lower part of the carriage 80. After the ink cartridges 82 to 87 are mounted on the carriage 80 from above, the ink can be supplied to the print head 90 from the respective cartridges.

The control unit 30 includes a CPU 40, a ROM 51, a RAM 52 and an EEPROM 60, which are connected with each other through a bus. The control unit 30 controls an overall operation of the printer 20 by developing and executing programs stored in the RAM 51 or the EEPROM 60 into the RAM 52, and also has functions of an input section 41, a halftone processing section 42, and a printing section 46. The function of the halftone processing section 42 includes functions of a comparison section 43 and an error diffusion section 44. The respective functional sections will be described hereinafter.

A dither mask 61 and an error diffusion threshold table 62 are stored in the EEPROM 60. The dither mask 61 is used for the halftone process by means of a systematic dithering method, and includes a plurality of thresholds. The dither mask 61 has a so-called blue noise characteristic in this embodiment.

Further, in this embodiment, the dither mask 61 has a predetermined dot formation characteristic. That is, a dot pattern of a dot group which is formed by the forward movement of the carriage 80 in the bidirectional printing, a dot pattern of a dot group which is formed by the backward movement thereof, and a dot pattern of a total dot group which is a combination of the above dot groups have a characteristic of a desired dot dispersing ability. Such a technique, for example, is disclosed in JP-A-2007-15359. Further, the dither mask 61 may be configured to obtain a desired dot dispersing ability for every main scanning group indicating that dots are formed in any specific main scanning among a plurality of main scannings of the carriage 80, instead of or in addition to the group for every reciprocal movement.

The desired dot dispersing ability can be specified as a state where the dot pattern has a blue noise characteristic or a green noise characteristic. Alternatively, the desired dot dispersing ability can be specified as a state where each of the space frequency distributions of the thresholds of the dither mask which are set in pixels which belong to each of the plurality of groups and a space frequency distribution of a printed image have a positive correlation coefficient, preferably, a correlation coefficient 0.7 or more. The error diffusion threshold table 62 is a table in which thresholds used for determining ON/OFF of a dot in an error diffusion method are stored, details of which will be described later.

A memory card slot 98 is connected to the control unit 30, and image data ORG can be read from a memory card MC which is inserted in the memory card slot 98 for input. In this embodiment, the image data ORG input from the memory card MC is data which is made of three color components of red (R), green (G) and blue (B).

The printer 20 having such a hardware configuration drives the carriage motor 70 to reciprocally move the print head 90 with respect to the printing medium P in the main scanning direction, and drives the paper feeding motor 74 to move the printing medium P in the sub-scanning direction. The control unit 30 drives nozzles at an appropriate timing on the basis of the printing data, according to the reciprocal movement of the carriage 80 (main scanning) or the movement of the paper feeding of the printing medium (sub-scanning), to thereby form ink dots having an appropriate color in an appropriate position on the printing medium P. Accordingly, the printer 20 can print the color image input from the memory card MC on the printing medium P.

A-2. Printing Process

Figure 2:
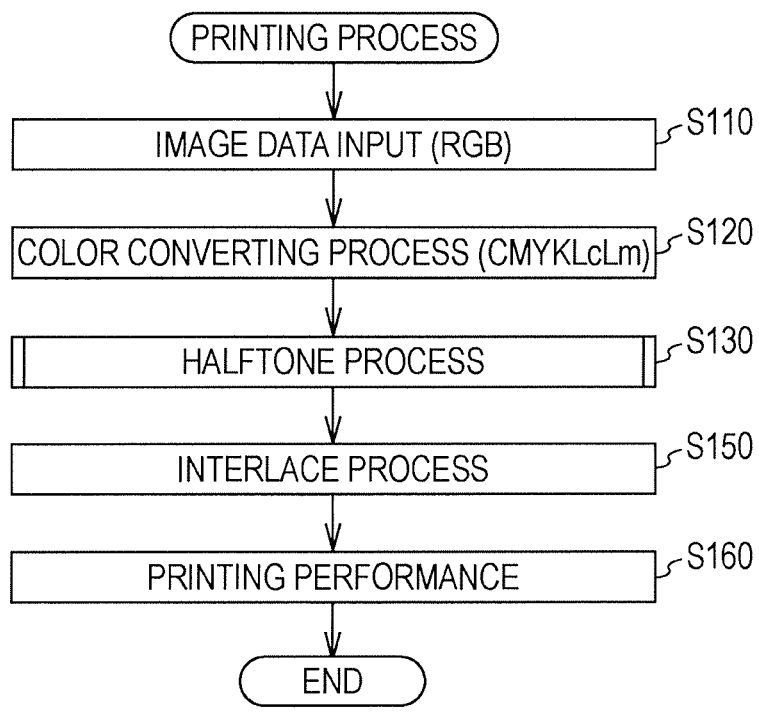
FIG. 2 is a flowchart illustrating an example of an algorithm for a printing process in a printer according to the first embodiment.

A printing process in the printer 20 will be described. FIG. 2 is a flowchart illustrating an example of an algorithm for the printing process in the printer 20 according to the first embodiment. The printing process starts as a user performs a printing instruction manipulation of a predetermined image which is stored in the memory card MC, using the manipulation panel 99 or the like. If the printing process starts, the CPU 40 reads the image data ORG of an RGB format which is a printing target from the memory card MC through the memory card slot 98 for input, as a process of the input section 41 (step S110).

If the image data ORG is input, the CPU 40 color-converts the RGB format into a CMYKLcLm format with respect to the image data ORG, with reference to a lookup table (not shown) which is stored in the EEPROM 60 (step S120).

If the color conversion process is performed, the CPU 40 performs a halftone process for converting the image data into ON/OFF data of dots of each color, as a process of the halftone processing section 42 (step S130). The halftone process will be described later in detail. Further, the halftone process is not limited to a binarization process of the dot ON/OFF, and may be a multi-valued process such as ON/OFF of large dots and small dots. Further, the image data provided in step S130 may be obtained by performing an image process such as a resolution converting process or a smoothing process.

If the halftone process is performed, the CPU 40 performs an interlace process for sorting dot pattern data to be printed in the unit of one main scanning according to the nozzle arrangement of the printer 20, the feeding amount of the paper, or the like (step S150). If the interlace process is performed, the CPU 40 drives the print head 90, the carriage motor 70, the motor 74 and so on to perform the printing, as a process of the printing section 46 (step S160).

A-3. Halftone Process

Details of the above described halftone process (step S130) will be described with reference to FIG. 3. As shown in the figure, if the halftone process starts, the CPU 40 firstly obtains coordinate data n(x, y) of a target pixel position, and a target pixel data Dn with respect to the image data in which the color conversion process is performed in step S120 (step S131).

If the coordinate data n(x, y) of the target pixel position and the target pixel data Dn are obtained, the CPU 40 performs a temporary dithering process as a process of the comparison section 43 (step S132). The temporary dithering process is a process for determining a size relationship between a grayscale value of the target pixel data Dn and a threshold THn_d corresponding to the target pixel data Dn among a plurality of thresholds forming the dither mask 61 which is stored in the EEPROM 60. The process executed in step S132 is basically the same process as the process of determining the ON/OFF of the dots according to a conventional dithering method using a dither mask. More specifically, in the conventional dithering method, in a case where the grayscale value of the target pixel data Dn is equal to or larger than the threshold THn_d, it is determined that the dot is ON, and in a case where the grayscale value of the target pixel data Dn is smaller than the threshold THn_d, it is determined that the dot is OFF. However, the temporary dithering process in step S132 according to the present embodiment is distinguished over the conventional process in that it serves as a pre-process for determining the ON/OFF of the dot by means of the error diffusion method which will be described later. In other words, the temporary dithering process serves as a process for determining the threshold of the error diffusion method.

As a result of the temporary dithering process, if the grayscale value of the target pixel data Dn is equal to or larger than the threshold THn_d (step S132: YES), a threshold THe which is used for the error diffusion method is set to a lower threshold THe_L (step S133). On the other hand, if the grayscale value of the target pixel data Dn is smaller than the threshold THn_d (step S132: NO), the threshold THe, which is used for the error diffusion method is set to a higher threshold THe_H (step S134). In this way, in this embodiment, the threshold THe which is used for the error diffusion method is configured to be changed on the basis of the result of the temporary dithering process. Such a setting of the threshold THe in step S133 or S134 is performed based on the grayscale value of the target pixel data Dn obtained in step S131 with reference to the error diffusion threshold table 62 which is stored in the EEPROM 60.

Figure 4:
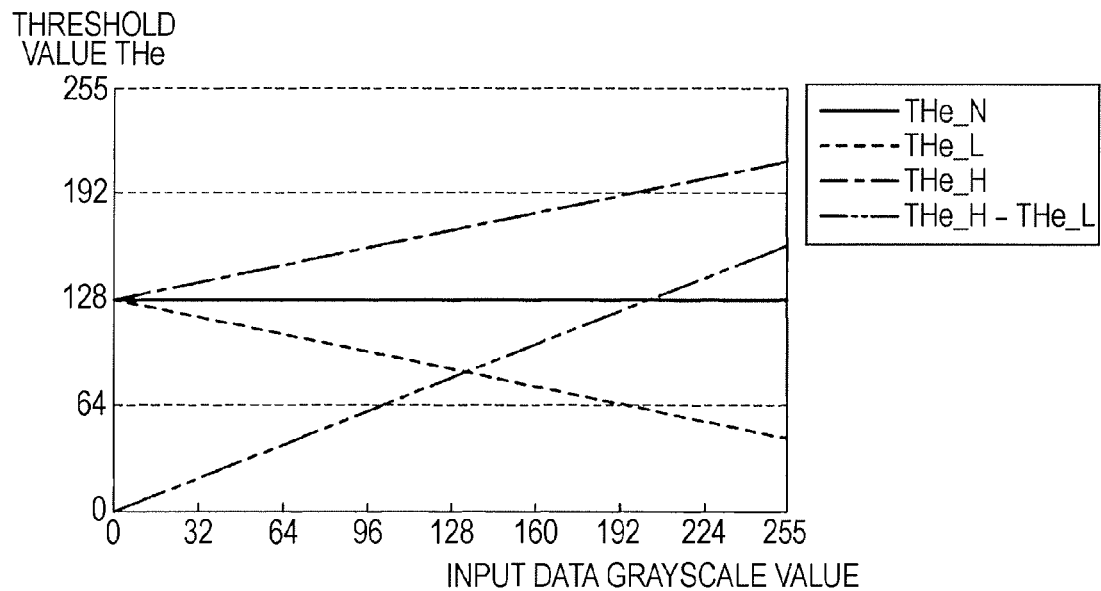
FIG. 4 is a diagram illustrating a characteristic of an error diffusion threshold table according to the first embodiment.

FIG. 4 schematically illustrates one example of the error diffusion threshold table 62. As shown in the figure, the error diffusion threshold table 62 defines relationships between the grayscale value of the target pixel data Dn (herein, 0 to 255), and each of the lower threshold THe_L and the higher threshold THe_H. A threshold THe_N in the figure represents an example of the threshold which is used in the typical error diffusion method as a reference. In this example, the threshold THe_N is a constant value 127.5, irrespective of the grayscale of the target pixel data Dn.

In the example as shown in FIG. 4, the higher threshold THe_H is a value 127.5 in a case where the grayscale value of the target pixel data Dn is 0, and becomes large as the grayscale value becomes large from 0. Finally, in a case where the grayscale value is 255, the higher threshold THe_H becomes a value 207.5. The lower threshold THe_L is the same value 127.5 as in the higher threshold THe_H in the case where the grayscale value of the target pixel data Dn is 0, and becomes smaller as the grayscale value become large from 0. In the case where the grayscale value is 255, the lower threshold THe_L becomes a value 47.5.

In other words, the difference between the higher threshold THe_H and the lower threshold THe_L (hereinafter, referred to as threshold difference ΔTHe) is 0 in the case where the grayscale value is 0, and becomes large as the grayscale value becomes large. In the case where the grayscale value is 255, the difference becomes 80. That is, in the example as shown in FIG. 4, the error diffusion threshold table 62 is set so that the threshold difference ΔTHe becomes large as the grayscale value becomes large (herein, in direct proportion to each other), over the entire range of the grayscale value. In this way, a size relationship between the higher threshold THe_H and the lower threshold THe_L is set so that the higher threshold THe_H and the lower threshold THe_L have the same value or so that the higher threshold THe_H becomes relatively larger than the lower threshold THe_L. Here, a case where the higher threshold THe_H and the lower threshold THe_L are the same with respect to all the grayscale values (such as a case of THe_N) is excluded. Further, as long as such a size relationship is maintained, the higher threshold THe_H and the lower threshold THe_L for every grayscale value can be set to have any value. Although the higher threshold THe_H and the lower threshold THe_L according to the grayscale value are calculated with reference to the table in this embodiment, the higher threshold THe_H and the lower threshold THe_L may be calculated according to a function.

Figure 3:
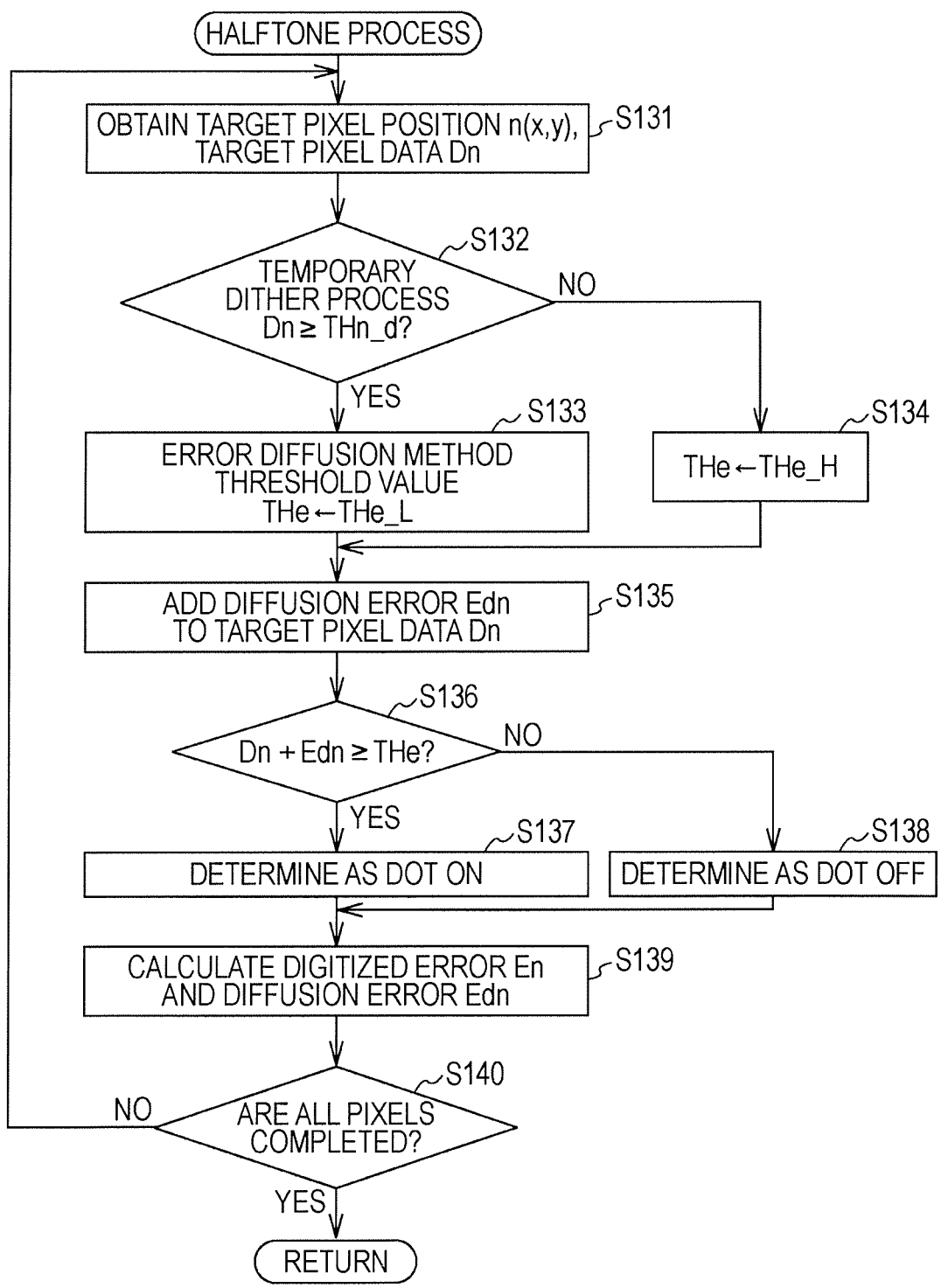
FIG. 3 is a flowchart illustrating an example of an algorithm for a halftone process according to the first embodiment.

Returning to the halftone process as shown in FIG. 3, after the threshold THe is set in step S133 or S134 with reference to the error diffusion threshold table 62, the CPU 40 adds a diffusion error Edn which is stored in an error buffer which is separately prepared, to the grayscale value of the target pixel data Dn (step S135). In this respect, the diffusion error Edn is calculated in step S139 which will be described later.

After the diffusion error Edn is added to the grayscale value of the target pixel data Dn, the CPU 40 compares the grayscale value of the target pixel data Dn to which the diffusion error Edn is added, with the threshold THe which is set in step S133 or step S134 (step S136). As a result, if the grayscale value of the target pixel data Dn to which the diffusion error Edn is added is equal to or larger than the threshold value THe (step S136: YES), it is determined that the dot of the target pixel is ON (step S137), and if the grayscale value of the target pixel data Dn to which the diffusion error Edn is added is smaller than the threshold value THe (step S136: NO), it is determined that the dot of the target pixel is OFF (step S138).

If the ON/OFF of the dot is determined, the CPU 40 calculates the binarization error En (also referred as a digitized error) and the diffusion error Edn (step S139). The binarization error En is a difference between the grayscale value of the target pixel data Dn to which the diffusion error Edn is added and the grayscale value 255 or 0 depending on the ON/OFF result of the dot determined in step S137 or S138. The diffusion error Edn is an error which is added to the grayscale value of the target pixel data Dn in step S135. In the present embodiment, the binarization error En is distributed as the diffusion error Edn, at a ratio of 7/16 with respect to a right adjacent pixel of the target pixel, at a ratio of 3/16 with respect to a lower left pixel thereof, at a ratio of 5/16 with respect to a lower pixel thereof, and at a ratio of 1/16 with respect to a lower right pixel thereof, which are peripheral pixels in which the ON/OFF of dots are not determined. The diffusion error Edn calculated in this way is stored in the error buffer.

The above described processes of steps S135 to S139 are the halftone process by means of the error diffusion method, which is performed as the process of the error diffusion section 44. Since the error diffusion method is a well-known technique, detailed description thereof will be omitted. The error diffusion method is a technique for quantizing each piece of image data by comparing each piece of image data with a predetermined threshold, while adding a quantized error of each piece of image data to a piece of peripheral image data at a predetermined distribution ratio. Although, in the above described example, steps S135 to S139 are the binarization process for determining only the ON/OFF of the dots, these steps may be performed by a multi-valued process such as a determination of the ON/OFF of large dots and small dots.

Further, if the binarization error En and the diffusion error Edn are calculated, the CPU 40 repeats the processes of step S131 to S139 using all the pixels as the target pixel (step S140). In this way, the halftone process of step S130 is completed.

Such a principle of the halftone process will be described hereinafter. As described above, in the processes of steps S132 to S134, if the grayscale value of the target pixel data Dn is equal to or larger than the threshold THn_d, the threshold THe which is used for the error diffusion method is set to the lower threshold THe_L, and if the grayscale value of the target pixel data Dn is smaller than the threshold THn_d, the threshold THe is set to the higher threshold THe_H. The threshold difference ΔTHe (=THe_H-THe_L) is a value of 0 or more.

In this respect, in a case where the threshold difference ΔTHe is 0, it is considered that THe_H=THe_L. In this case, since a result of the temporary dithering process does not influence the threshold THe (i.e., the threshold value is set to the same value regardless of the result of the temporary dithering process), the processes of steps S132 to S134 do not have any significance to a determination of a final dot ON/OFF by means of the error diffusion method (steps S135 to S139). This means that the final dot ON/OFF is determined by only the error diffusion method element in the halftone process in step S130.

Next, in a case where the threshold value ΔTHe is larger than the value 0, it is considered that THe_H>THe_L. In this case, if it is determined that the dot is ON by means of the temporary dithering method (the grayscale value of the target pixel data Dn is equal to or larger than the threshold THn_d), the CPU 40 sets the threshold THe to a relatively lower threshold THe_L. On the other hand, if it is determined that the dot is OFF by means of the temporary dithering process (the grayscale value of the target pixel data Dn is smaller than the threshold THn_d), the CPU 40 sets the threshold value THe to a relatively higher threshold value THe_H. That is, if it is determined that the dot is ON by means of the temporary dithering process, the CPU 40 performs control so that the dot can become easily ON by the subsequent error diffusion method. Further, if it is determined that the dot is OFF by means of the temporary dithering process, the CPU 40 performs control so that the dot can become easily OFF by the subsequent error diffusion method. This means that the determination result of the final dot ON/OFF by means of the error diffusion method is close to the determination result of the dot ON/OFF by means of the temporary dithering process, compared with the case where the threshold difference ΔTHe is the value 0. That is, the final dot ON/OFF is determined by adding the dithering method element to the error diffusion method element.

Further, as the threshold difference ΔTHe becomes large, the dithering method element becomes large. If the threshold difference ΔTHe reaches an infinite value, the dot ON/OFF is completely determined by only the dithering method element. This is because, in a case where the threshold difference ΔTHe is the infinite value, if it is determined that the dots are ON by the temporary dithering process, it is necessarily determined that the dots are ON by means of the subsequent error diffusion method; and if it is determined that the dots are OFF by the temporary dithering process, it is necessarily determined that the dots are OFF by means of the subsequent error diffusion method.

Briefly, as the threshold THe is varied according to the result of the temporary dithering process, specifically, as the size of the threshold difference ΔTHe is varied, each contribution level of the dithering method element and the error diffusion method element in the halftone process can be controlled. In the present embodiment, using such a principle, according to the grayscale value of the target pixel data Dn, the dithering method element and the error diffusion method element are dynamically controlled in the halftone process. This means that a control level (in this embodiment, corresponding to the threshold difference ΔTHe) for the easiness of the dot formation according to the error diffusion method is adjusted according to the size of the threshold difference ΔTHe.

When the printer 20 having such a configuration generates dot data according to the error diffusion method, the easiness of the dot formation (or the criterion of the dot formation) according to the error diffusion method is controlled using the result of the temporary dithering process. That is, on the basis of the determination result of the dot ON/OFF in the case where the temporary dithering method is used, the easiness of the dot formation according to the error diffusion method is controlled by changing a parameter indicative of the easiness of the dot formation according to the error diffusion method (in this embodiment, the threshold THe used in the error diffusion method). Accordingly, the halftone process which employs the dithering method element and the error diffusion method element can be performed.

Further, in a case where the result of the temporary dithering process is the dot ON, the printer 20 performs control so that the threshold THe used for the error diffusion method is set to the lower threshold THe_L and the dots are easy to be formed according to the error diffusion method. Further, the result of the temporary dithering process is the dot OFF, the printer 20 performs control so that the threshold THe is set to the higher threshold THe_H and the dots are hard to be formed according to the error diffusion method. Under any control, compared with the dot data by means of the simple error diffusion method, the presence or absence of the dot formation is close to the result of the dithering method, and thus, the dithering method element is increased. Accordingly, as the control level thereof, that is, the threshold difference ΔTHe is properly set, the contribution level of the dithering method element and the error diffusion method element in the halftone process can be set at a desired level. Further, as the threshold THe is varied on the basis of the result of the temporary dithering process, the easiness of the dot formation is controlled according to the error diffusion method, to thereby achieve a simplified configuration and a high speed process.

In addition, since the easiness of the dot formation is controlled according to the error diffusion method, by varying the size of the threshold THe, specifically, the threshold difference ΔTHe on the basis of the grayscale value of the target pixel data Dn, the printer 20 can vary the contribution level of the dithering method element and the error diffusion method element. Further, such a contribution level can be varied for every arbitrary region of the image data. As a result, the dot data having a desired contribution level according to the characteristic of the image data or the printing device can be generated, and the printing image quality can be improved.

In the present embodiment, the error diffusion threshold table 62 is set so that the threshold difference ΔTHe becomes large as going to a high grayscale side. That is, since the printer 20 increases the control level of the easiness of the dot formation according to the error diffusion method, with respect to the image data of a high grayscale, compared with the image data of a low grayscale, the dithering method element can be increased in the high grayscale side compared with the low grayscale side. Accordingly, an advantage of the error diffusion method element can be obtained in the low grayscale side, whereas an advantage of the dithering method element can be obtained in the high grayscale side.

As the advantage of the error diffusion method element in the low grayscale side, for example, a desired granularity of the printing image quality may be obtained. If a diffusion range switching error diffusion method or the like is used as the error diffusion method, the image quality improvement can be expected. Since the diffusion range switching error diffusion method is a well-known technique, detailed description thereof will be omitted. This is a technique in which an error diffusion range is switched according to a combination of the input grayscale value and the binarization result, in which the error diffusion can be performed in a wide range only when the dots are ON in the low grayscale value, to thereby improve the granularity of the low grayscale region and restrict generation of a non-desired dot consecution, that is, a so-called worm.

As the advantage of the dithering method element in the high grayscale side, for example, image deterioration due to deviation from a dot landing position may be restricted. The advantage is caused by the predetermined dot formation characteristic of the dither mask 61. Further, even though the dot data is generated according to the dithering method in the high grayscale region, the granularity of the printing image quality is hardly distinguished by ink bleed, which causes no significant problems.

Moreover, the error diffusion threshold table 62 is set so that the threshold difference ΔTHe is varied by stages on the basis of the size of the grayscale value. That is, the printer 20 varies by stages the control level of the easiness of the dot formation according to the error diffusion method, on the basis of the size of the grayscale value. Accordingly, the contribution level of the dithering method element and the error diffusion component can be smoothly varied according to the data grayscale value. As a result, in the printing result, since the variation in the contribution level of the dithering method element and the error diffusion method element is hardly visualized, deterioration of the printing image quality due to the variation in the contribution level of the dithering method element and the error diffusion method element in the same printing image can be restricted.

In particular, in the present embodiment, since a mask having a blue noise characteristic which is excellent in the granularity of the printing image quality is used as the dither mask 61, the change in the contribution level of the error diffusion method element which is excellent in the granularity of the printing image quality can be more smoothly shown. Further, even though the dither mask 61 dose not have the blue noise characteristic, if the control level of the easiness of the dot formation by means of the error diffusion method is varied by stages on the basis of the size of the grayscale value, the contribution level of the dithering method element and the error diffusion method element can be smoothly varied according to the data grayscale value.

Such a characteristic of the printer 20 can lie in that a connection part between dots which are formed by the dithering method element and dots which are formed by the error diffusion method element cannot be visualized with the naked eyes, in a case where the grayscale value is varied from a maximum value to a minimum value to print one image, from a point of view of a printed matter of the printer 20. If the dithering method and the error diffusion method are switched using a specific grayscale as a boundary, such a characteristic cannot be obtained.

B. Second Embodiment

Figure 5:
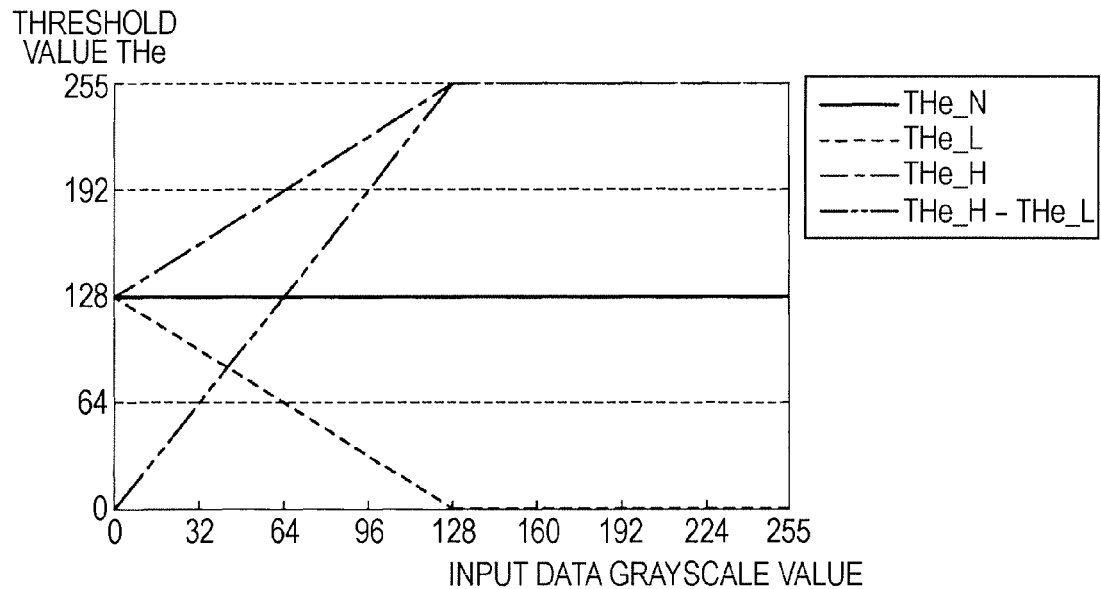
FIG. 5 is a diagram illustrating a characteristic of an error diffusion threshold table according to a second embodiment.

A second embodiment of the present invention will be described. An apparatus configuration and a procedure of the printing process of the printer 20 are the same as in the first embodiment, and only the characteristic of the error diffusion threshold table 62 is different from the first embodiment. Hereinafter, with respect to the same configuration and procedure as in the first embodiment, detailed description will be omitted, and only the difference will be described. FIG. 5 illustrates one example of the error diffusion threshold table 62 according to the second embodiment. This embodiment is different from the first embodiment in that the increasing rate of the higher threshold THe_H as the grayscale value is increased and the decreasing rate of the lower threshold THe_L are large, and the grayscale value is constant to be equal to or larger than a predetermined value.

If the difference is considered as the threshold difference ΔTHe, the threshold difference ΔTHe is a value 0 in a case where the grayscale value is 0, becomes large as the grayscale value becomes large, and becomes a value 255 in a case where the grayscale value is 128. Then, until the grayscale value becomes 255, the threshold value ΔTHe maintains 255 constantly. That is, in the example as shown in FIG. 5, the error diffusion threshold table 62 is set so that the threshold difference ΔTHe becomes large as the grayscale value becomes large, in the grayscale value range of 0 to 128.

In a case where the error diffusion threshold table 62 has such a characteristic, compared with the first embodiment (FIG. 4), since the change amount of the threshold difference ΔTHe with respect to the change of the grayscale value of the target pixel data Dn becomes large and since a final value of the threshold difference ΔTHe becomes large, the dithering method element is increased in each grayscale value. In particular, in the grayscale value range of 128 or more, the dithering method element becomes remarkably strong. In this embodiment, in a case where the threshold difference ΔTHe is a value 255, since the final dot ON/OFF is determined by almost only the dithering method element, the threshold difference ΔTHe is constant in the grayscale value range of 128 or more. If the threshold difference ΔTHe becomes large, the dot ON/OFF can be determined by entirely only the dithering method element.

Since the threshold difference ΔTHe which is demanded for determining the dot ON/OFF by almost only the dithering method element is varied according to the characteristic of the dither mask 61, the threshold difference ΔTHe may be properly set with reference to an actual output result. Further, the maximum value of the higher threshold THe_H may be set as a value which is larger than 255, or the minimum value of the lower threshold THe_L may be set as a value which is smaller than 0, so that a difference value with respect to the threshold difference ΔTHe may be larger.

Further, if the characteristic of the error diffusion threshold table 62 is a dot centralized type, for example, by means of halftone dot dithering, dots continuously become ON or OFF in adjacent pixels, and thus, the diffusion error Edn which is distributed to peripheral pixels is likely to be cumulatively larger. Accordingly, in order to determine the dot ON/OFF by almost only the dithering method element, it is preferable that the threshold difference ΔTHe becomes large.

The printer 20 in which the error diffusion threshold table 62 having the above described characteristic is stored, in the range of a part of grayscale values (here, 0 to 128) among the all grayscale values (here, 0 to 255) of the target pixel data Dn, as the grayscale value becomes large, the threshold difference ΔTHe becomes large. Thus, in the range, the contribution level of the dithering method element and the error diffusion method element in the dot ON/OFF determination can be smoothly varied. Further, with respect to the printing region of the high grayscale (here, grayscale values 128 to 255), the final dot ON/OFF can be determined by almost only the dithering method element. Accordingly, by utilizing to the maximum the characteristic of the dither mask 61 of the present embodiment having such an effect that the image deterioration due to deviation of the dot landing position in the high grayscale region is restricted, a desired printing image quality can be obtained.

C. Third Embodiment

Figure 6:
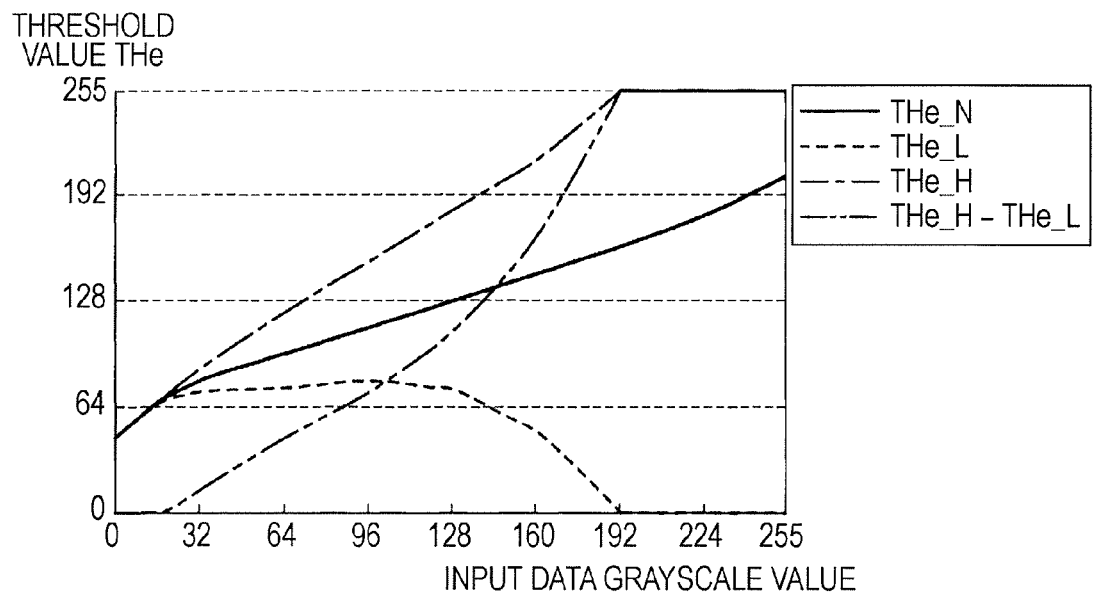
FIG. 6 is a diagram illustrating a characteristic of an error diffusion threshold table according to a third embodiment.

A third embodiment according to the present invention will be described. An apparatus configuration or a procedure of the printing process of the printer 20 is the same as in the first embodiment, and only the characteristic of the error diffusion threshold table 62 is different from the first embodiment. Hereinafter, with respect to the same configuration and procedure as in the first embodiment, detailed description will be omitted, and only the difference will be described. FIG. 6 illustrates one example of the error diffusion threshold table 62 according to the third embodiment, which illustrates an example of the higher threshold THe_H and the lower threshold THe_L in a case where a threshold optimization error diffusion method is employed as the error diffusion method which is used in step S130. Since the threshold optimization error diffusion method is a well-known technique, detailed description thereof will be omitted. However, the threshold optimization error diffusion method is a technique for varying the threshold THe according to the input grayscale value, which can restrict a so-called dot formation delay and afterimage.

As shown in FIG. 6, the threshold THe_N which is an example of the threshold value in the threshold optimization error diffusion method is controlled to be increased as the grayscale value of the target pixel data Dn becomes large, by means of the threshold optimization error diffusion method. Here, in the grayscale value range of 0 to 16 of the target pixel data Dn, the threshold difference ΔTHe is 0, and the higher threshold THe_H and the lower threshold THe_L coincide with the threshold THe_N. In the grayscale value range of 16 to 192, the higher threshold THe_H and the lower threshold THe_L are set so that the higher threshold THe_H is larger than the threshold THe_N, and the lower threshold THe_L is smaller than the threshold value THe_N, and thus, the threshold difference ΔTHe becomes large as the grayscale value becomes large. In the grayscale value range of 192 to 255, the higher threshold THe_H and the lower threshold THe_L are set so that the threshold difference ΔTHe is a constant value 255.

If the error diffusion threshold table 62 has such a characteristic, in the low grayscale region (here, the grayscale value of 0 to 16), the threshold difference ΔTHe is set to 0, and thus, the halftone process is performed by only the error diffusion method element, by means of the threshold optimization error diffusion method. Accordingly, an advantage of the threshold optimization error diffusion method which is excellent in the granularity in the low grayscale region, compared with the dithering method can be sufficiently achieved.

Further, in the high grayscale region (here, the grayscale value of 192 to 255), the threshold difference ΔTHe is set to a value corresponding to almost only the dithering method element, and thus, an advantage of the dithering method element according to the present embodiment which restricts the image deterioration due to the deviation of the dot landing position can be sufficiently achieved. Further, from the viewpoint of the granularity, the error diffusion method element is stronger than the dithering method. However, even though the dithering method element becomes strong in the high grayscale region, the granularity of the printing image quality causes no significant problems, due to the ink bleed or the like.

Further, in a medium grayscale region (here, the grayscale value of 16 to 192), the halftone process is performed so that the error diffusion method element is combined with the dithering method element, and the dithering method element becomes strong as the grayscale value becomes large, and thus, the contribution level of the dithering method element and the error diffusion method element can be smoothly varied. In this way, the characteristic of the error diffusion threshold table 62 according to the present embodiment lies in that the optimal halftone process can be performed according to the grayscale value.

D. Fourth Embodiment

Figure 7:
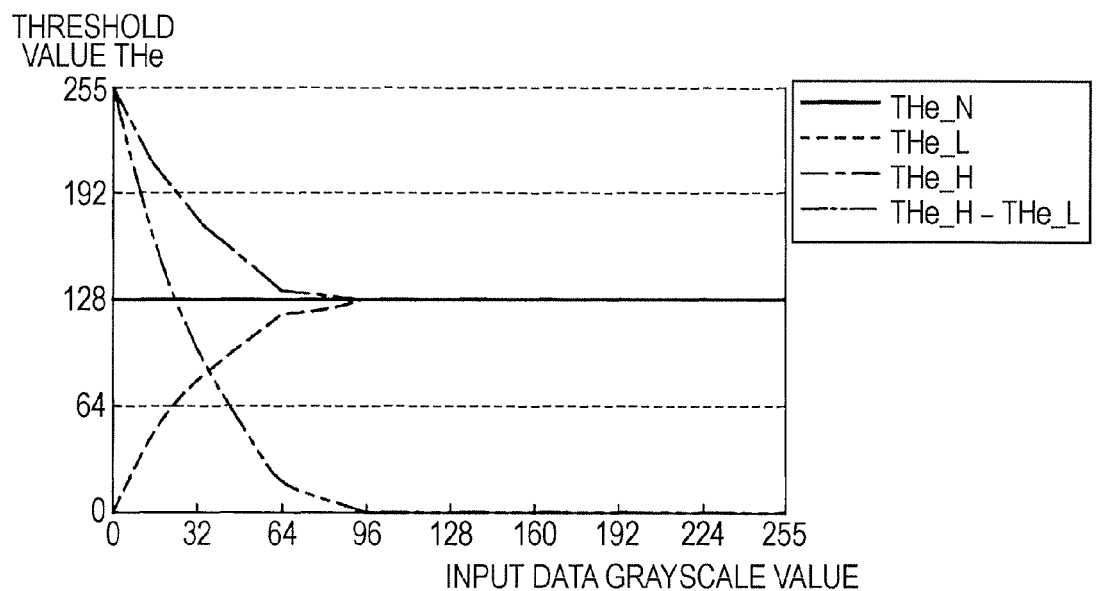
FIG. 7 is a diagram illustrating a characteristic of an error diffusion threshold table according to a fourth embodiment.

A fourth embodiment according to the present embodiment will be described. An apparatus configuration or a procedure of the printing process of the printer 20 is the same as in the first embodiment, and only the characteristic of the error diffusion threshold table 62 is different from the first embodiment. Hereinafter, with respect to the same configuration and procedure as in the first embodiment, detailed description will be omitted, and only the difference will be described. FIG. 7 illustrates one example of the error diffusion threshold table 62 according to the fourth embodiment, which illustrates an example of the higher threshold THe_H and the lower threshold THe_L in a case where a technique without measures against the worm, such as a diffusion range switching error diffusion method as described above, is applied to the error diffusion method which is used in step S130.

In this embodiment, as shown in FIG. 7, the threshold difference ΔTHe is a value 255 in a case where the grayscale value of the target pixel data Dn is 0, becomes small as the grayscale value becomes large, and becomes a value 0 in a case where the grayscale value reaches 96. Then, until the grayscale value becomes 255, the threshold value ΔTHe maintains a constant value 0. According to the characteristics of the error diffusion method element and the dithering method element used in the halftone process, even though the control is performed so that the dithering method element becomes strong as going to a low grayscale region, and the error diffusion method element becomes strong as going to a high grayscale region, the optimal halftone process can be performed according to the grayscale value. This is because the image quality deterioration due to the worm in the low grayscale region causes significant problems in the error diffusion method in which the worm measures are not taken, but if the grayscale value is equal to or larger than a predetermined value, the image quality deterioration due to the worm causes no significant problems.

E. Fifth Embodiment

Figure 8:
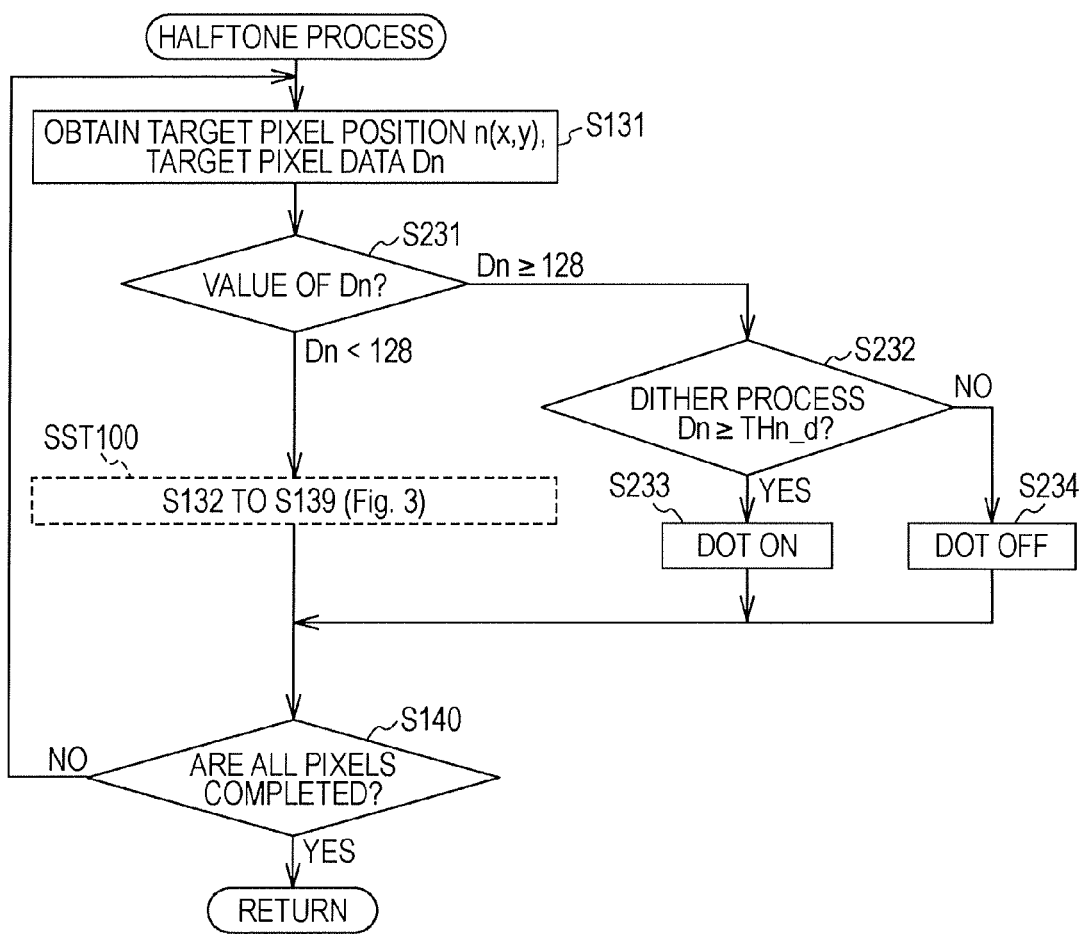
FIG. 8 is a flowchart illustrating an example of an algorithm for a halftone process according to a fifth embodiment.

A fifth embodiment according to the present invention will be described. An apparatus configuration of the printer 20 is the same as in the first embodiment, and a procedure of the printing process, specifically, only the process of the halftone process is different from the first embodiment. Further, the error diffusion threshold table 62 employs a table having the characteristic in the second embodiment (FIG. 5). Hereinafter, with respect to the same configuration as in the first embodiment, detailed description will be omitted, and only the difference will be described. FIG. 8 illustrates an example of an algorithm for the halftone process according to the fifth embodiment. In FIG. 8, with respect to the same process as in the halftone process as shown in FIG. 3, description thereof is simplified using the same numerals as in FIG. 3.

As shown in FIG. 8, if the halftone process starts according to the fifth embodiment, the CPU 40 obtains coordinate data n(x, y) of a target pixel position, and target pixel data Dn (step S131). Further, the CPU 40 determines whether the grayscale value of the target pixel data Dn is within a predetermined range (step S231). In this embodiment, it is determined whether the grayscale value of the target pixel data Dn is equal to or larger than 128.

As a result, if the grayscale value is smaller than 128, the CPU 40 performs a process (step SST100) of steps S132 to S139 as shown in the first embodiment (see FIG. 3). That is, dot ON/OFF is determined, while varying the strength of the dithering method element and the error diffusion method element according to the grayscale value.

On the other hand, if the grayscale value is equal to or larger than 128, the CPU 40 determines the dot ON/OFF by means of the dithering method using the dither mask 61. Specifically, the grayscale value of the target pixel data Dn is compared with the threshold THn_d (step S232). If the grayscale value is equal to or larger than the value of the threshold THn_d (step S232: YES), it is determined that the dot of the target pixel is ON (step S233); and if the grayscale value is smaller than the value of the threshold THn_d (step S232: NO), it is determined that the dot of the target pixel is OFF (step S234). That is, with respect to the grayscale value of the high grayscale (here, 128 or more), the dot ON/OFF determination due to the error diffusion method as shown in the above described embodiment is stopped, and the dot ON/OFF is determined by only the dithering method.

The CPU 40 repeatedly performs the process of the dot ON/OFF determination using all the pixels as the target pixel until the dot ON/OFF determination is completed with respect to all the pixels (step S140). Further the diffusion error Edn calculated in step S139 (see FIG. 3) is not reflected in the processes of step S232 to S234.

In a case where the grayscale value of the target pixel data Dn is in a predetermined range, the printer 20 having such a configuration stops the dot ON/OFF determination by means of the error diffusion method (step SST100) and determines the dot ON/OFF by means of the dithering method. Accordingly, in a case where there is a grayscale region in which the printing image quality is enhanced by forming the dot data with only the dithering method element, dot data having a good printing image quality can be generated in the corresponding region. Further, since there is no need to perform an operation of the error diffusion with respect to the grayscale value of the predetermined range, the dot ON/OFF can be determined by only a simple operation of comparing the grayscale value of the target pixel data Dn with the threshold THn_d for forming the dithering mask 61, and the halftone process can be performed at a high speed.

Further, in the printer 20, the predetermined range in which the dot ON/OFF determination by means of the error diffusion method is stopped is a range where the grayscale value is equal to or larger than 128. In this respect, in the error diffusion threshold table 62 according to the present embodiment, as shown in FIG. 5, in the grayscale value of 128 or less, the threshold difference ΔTHe is set to a value 255 capable of determining the final dot ON/OFF with almost only the dithering method element. That is, in the error diffusion threshold table 62, since the threshold difference ΔTHe stops the dot ON/OFF determination by means of the error diffusion method, in a range of the grayscale value which is equal to or larger than a grayscale value which becomes large to such a degree that the final dot ON/OFF can be determined with almost only the dithering method element (the dot ON/OFF is determined with only the dithering method), switching between the error diffusion method and the dithering method can be smoothly performed from the viewpoint of the dot formation characteristic. As a result, without the switching being visualized on the printing image, deterioration of the printing image quality can be restricted.

The above described predetermined range of the grayscale value for stopping the dot ON/OFF determination by means of the error diffusion method may be properly set according to a desired printing characteristic, for example, may be a grayscale value range of 96 or more, or of 160 or more. Further, as shown in FIG. 7, in a case where the dithering method element is to become strong in a relatively small grayscale value range, the determination of the dot ON/OFF by means of the error diffusion method may be stopped in a small grayscale value range which is equal to or smaller than a predetermined value. Further, in the grayscale value range in which the determination of the dot ON/OFF by means of the error diffusion method is stopped, in the error diffusion threshold table 62, the higher threshold THe_H or the lower threshold THe_L may not be set.

Figure 9:
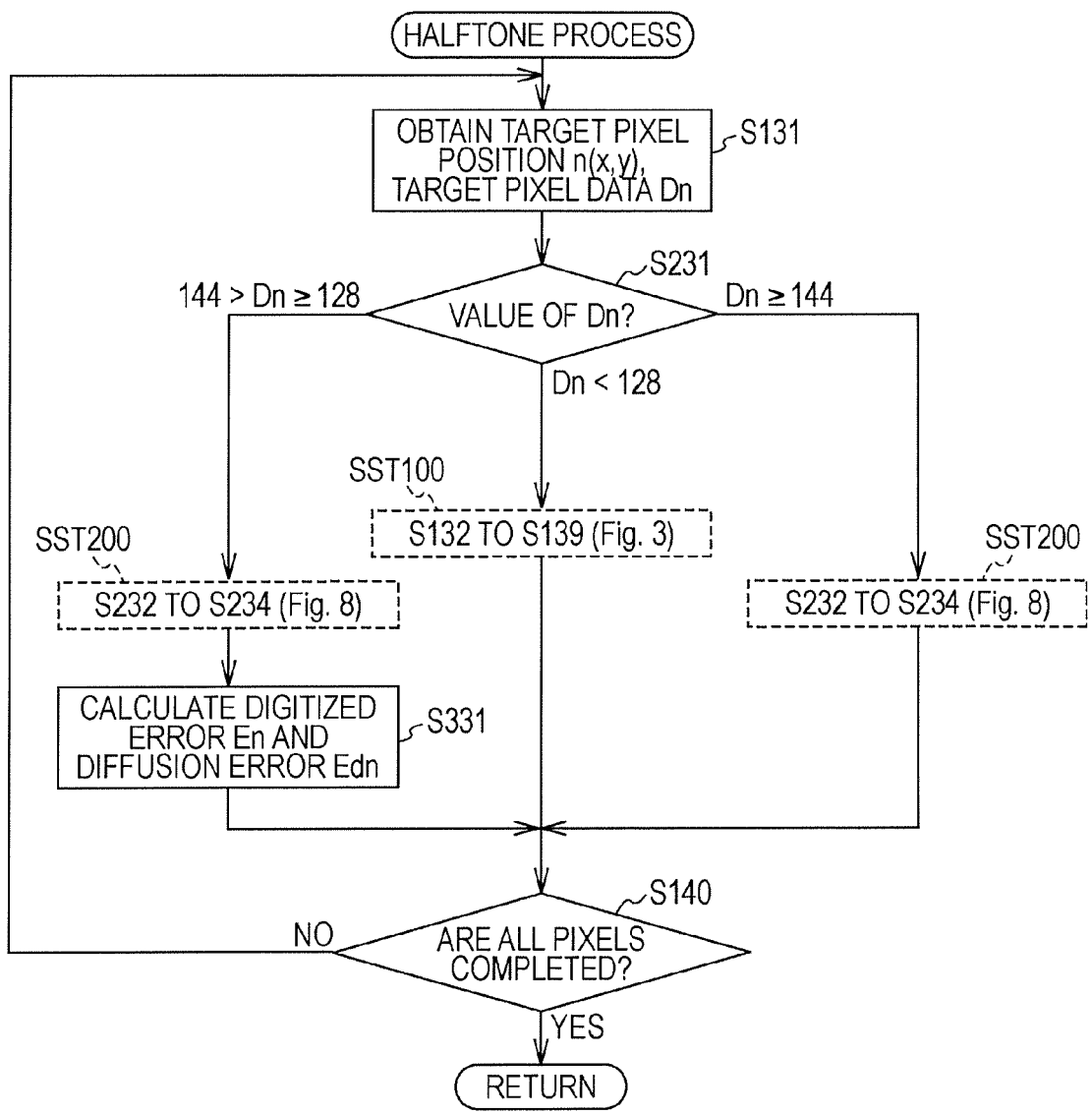
FIG. 9 is a flowchart illustrating a modified example of an algorithm for a halftone process according to the fifth embodiment.

Further, another configuration of the halftone process in which the determination of the dot ON/OFF by means of the error diffusion method is stopped in the predetermined range of the grayscale value will be described with reference to FIG. 9. In FIG. 9, with respect to the same process as the halftone process as shown in FIGS. 3 and 8, details thereof are simplified using the same numerals as in FIG. 3 or 8. In this example, the error diffusion threshold table 62 employs a table having the characteristic in the second embodiment (FIG. 5).

As shown in FIG. 9, if the halftone process starts, the CPU 40 obtains coordinate data n(x, y) of the target pixel position and the target pixel data Dn (step S131), and determines whether the grayscale value of the target pixel data Dn is within a predetermined range (step S231). In this embodiment, it is determined whether the grayscale value of the target pixel data Dn corresponds to any one of three ranges which are smaller than 128, 128 or larger and smaller than 144, and 144 or larger.

As a result, if the gray value is smaller than 128, the CPU 40 performs the processes (step SST100) of steps S132 to S139 as shown in the first embodiment (FIG. 3). On the other hand, if the grayscale value is equal to or larger than 144, the CPU 40 performs the processes (step SST200) of steps S232 to S234 as shown in the fifth embodiment (FIG. 8).

Further, if the grayscale value is in the range which is 128 or larger and is smaller than 144, the CPU 40 performs the processes (step SST200) of steps S232 to S234, and calculates the binarization error En and the diffusion error Edn (step S331). The calculated diffusion error Edn is reflected in step S135 of step SST100. The CPU 40 repeatedly performs the process of the dot ON/OFF determination using all the pixels as the target pixel until the dot ON/OFF determination is completed with respect to all the pixels (step S140).

In the halftone process as shown in FIG. 9 as described above, in the range of a first grayscale value (here, smaller than 128), the process of the error diffusion method of step SST100 is performed. In the range of a second grayscale value (here, smaller than 128) which is continuous to the range of the first grayscale value (here, 128 or larger and smaller than 144), a process for diffusing the binarization error En into peripheral pixels (referred to as a process of diffusion dithering method) is performed while determining the dot ON/OFF by means of the dithering method. Further, in the range of a third grayscale value (here, 144 or larger) which is continuous to the range of the second grayscale value, a process of a normal dithering method (step SST200) is performed to determine the dot ON/OFF. Accordingly, the switching of the halftone technique can be more smoothly performed, to thereby restrict deterioration of the printing image.

For example, in the halftone process as shown in FIG. 8, in a case where the input image data includes a region where the grayscale value is varied around 128, the process of step SST100 and the process of step SST200 may be frequently switched for consecutive pixels in the halftone process of the corresponding region. Then, in the consecutive pixels, in spite of approximately the same grayscale level, pixels in which the diffusion error is reflected and pixels where the diffusion error is not sufficiently reflected are close to and mixed with each other, and thus, deterioration of the image quality may occur.

On the other hand, as shown in FIG. 9, during the process for performing the dot ON/OFF determination is switched from the process of the error diffusion method of step SST100 into a process of the normal dithering method (step SST200) according to the grayscale value, if the process of the diffusion dithering method is added, the problem that the pixels where the diffusion error is reflected and the pixels where the diffusion error is not sufficiently reflected are close to and mixed with each other in spite of approximately the same grayscale level, can be restricted. As a result, deterioration of the image quality can be restricted.

F. Sixth Embodiment

Figure 10:
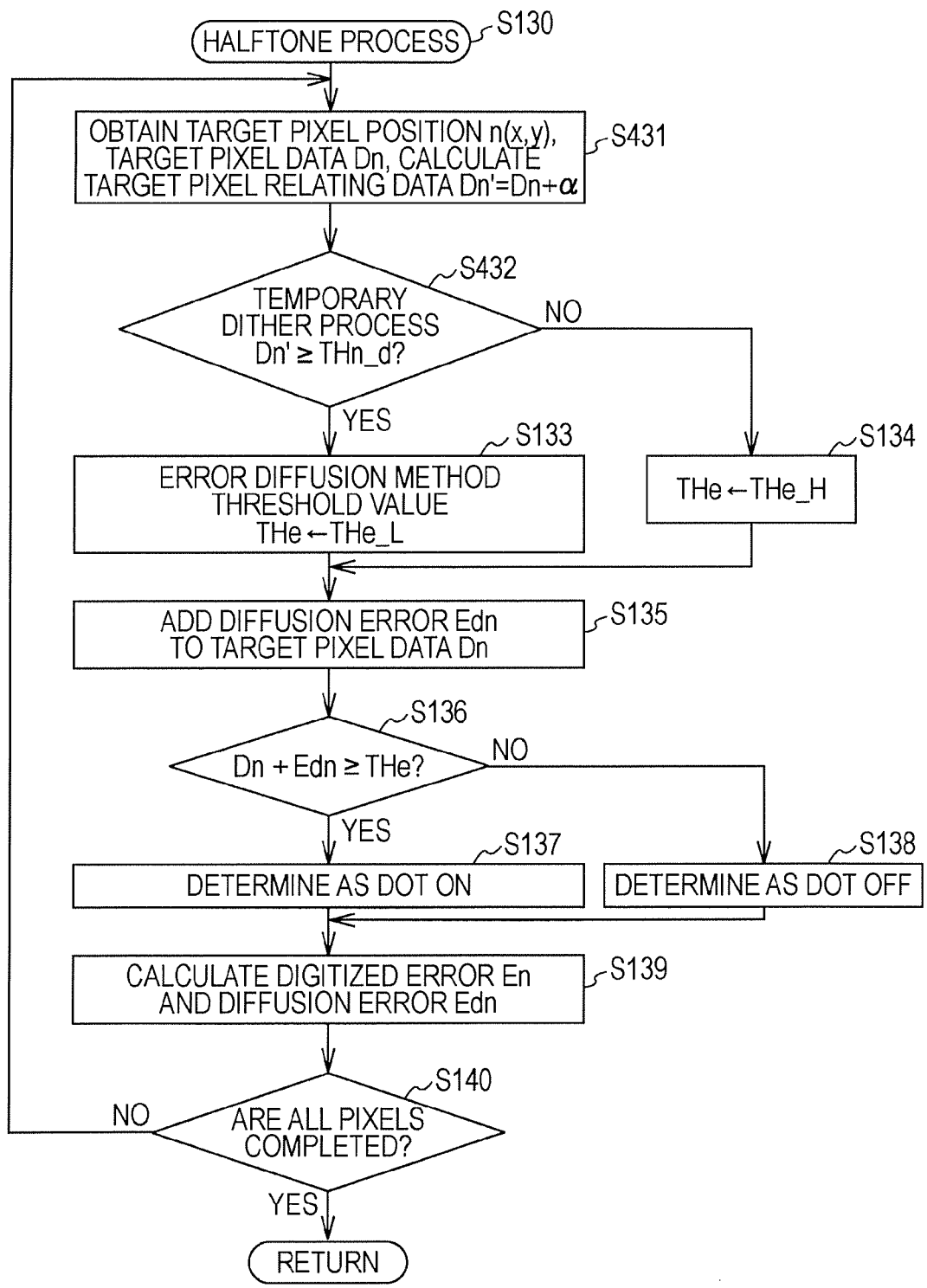
FIG. 10 is a flowchart illustrating an example of an algorithm for a halftone process according to a sixth embodiment.

A sixth embodiment according to the present invention will be described. A configuration of the printer 20 is the same as in the first embodiment, and a procedure of the printing process, specifically, only the halftone process is different from the first embodiment. Hereinafter, with respect to the same configuration as in the first embodiment, detailed description will be omitted, and only the difference will be described. FIG. 10 illustrates an example of an algorithm for the halftone process according to the sixth embodiment. Further, in FIG. 10, with respect to the same process as the halftone process as shown in FIG. 3, description thereof is simplified using the same numerals as in FIG. 3.

As shown in FIG. 10, if the halftone process according to the sixth embodiment starts, the CPU 40 obtains the coordinate data n(x, y) of the target pixel position and the target pixel data Dn, and adds a predetermined value α (α>0) to a grayscale value of the target pixel data Dn (step S431). Since the data calculated in this way is a grayscale value related to the grayscale value of the target pixel data Dn, it is referred to as related data Dn' (Dn'=Dn+α). In this embodiment, the predetermined value is α=4.

If the related data Dn' is calculated, the CPU 40 performs the temporary dithering method as a process of the comparison section 43 (step S432). This temporary dithering method is different from the temporary dithering method of step S132 in FIG. 3 is in that the related data Dn' is compared with the threshold value THn_d, instead of the comparison of the grayscale value of the target pixel data Dn with the threshold THn_d of the dither mask 61.

As a result, if the related data Dn' is equal to or larger than threshold THn_d (step S432: YES), the threshold THe used for the error diffusion method is set to the lower threshold THe_L (step S133). On the other hand, if the related data Dn' is smaller than the threshold THn_d (step S432: NO), the threshold THe used for the error diffusion method is set to the higher threshold THe_H (step S134). Since the subsequent processes of the error diffusion method (steps S135 to S139) are the same as in the first embodiment, description thereof will be omitted. Further, the dot ON/OFF determination of the error diffusion method is performed using the grayscale value of the target pixel data Dn, instead of using the related data Dn'.

As the halftone process having such a configuration performs the temporary dithering process by adding the predetermined value α to the grayscale value, the number of pixels determined as the dot ON (Dn'≧THn_d) by means of the temporary dithering process becomes larger than the number of pixels determined as the dot ON by means of the error diffusion method. That is, it is less likely that pixels other than the pixels determined as the dot ON by means of the temporary dithering process are finally determined as the dot ON by means of the subsequent error diffusion method. As a result, since the dot formation in a pixel position unrelated to a dot generation pattern of the dither mask 61 can be decreased, even though the threshold difference ΔTHe is not increased so much, the dithering method element can become stronger. That is, the level of reflection of the dot generation pattern provided in the dither mask is controlled, so that the contribution level of the dithering method element and the error diffusion method element can be more smoothly controlled. In other words, the threshold difference ΔTHe can be decreased so as to obtain the same dithering method element. If the threshold difference ΔTHe becomes decreased, the size of the binarization error En in the error diffusion method is also decreased, thereby resulting in improvement of the printing image quality.

The above described predetermined value α is not necessarily constant, and may be varied according to the grayscale value. Further, the predetermined value α may be 0 according to the grayscale value. Thus, the dithering method element can be more smoothly controlled. Further, the predetermined value α is not necessarily a positive number, and may be a negative number. For example, if the grayscale value is in the range of the low grayscale side (here, 127 or less), the predetermined value α may be set to the positive number; and if the grayscale value is in the range of the high grayscale side (here, 128 or more), the predetermined value α may be set to the negative number. As the relationship between the dot ON and the dot OFF is in a reverse relationship, for example, the control may be performed so that the predetermined value α is symmetric on the low grayscale side and the high grayscale side, from such a viewpoint. In this respect, the predetermined value α may be the positive number on the low grayscale side and may be the negative number on the high grayscale side.

Further, if the predetermined value α is set to the positive number and the higher threshold THe_H is increased to a considerable extent, in a case where the threshold THe is set to the higher threshold THe_H (step S134), the dot may be hard to be ON by the error diffusion method, and thus, it is less likely that the pixels other than the pixels determined as the dot ON in the temporary dithering process are finally determined as the dot ON by means of the subsequent error diffusion method. That is, the final halftone result can be close to the dot generation pattern provided in the dither mask 61.

Figure 11:
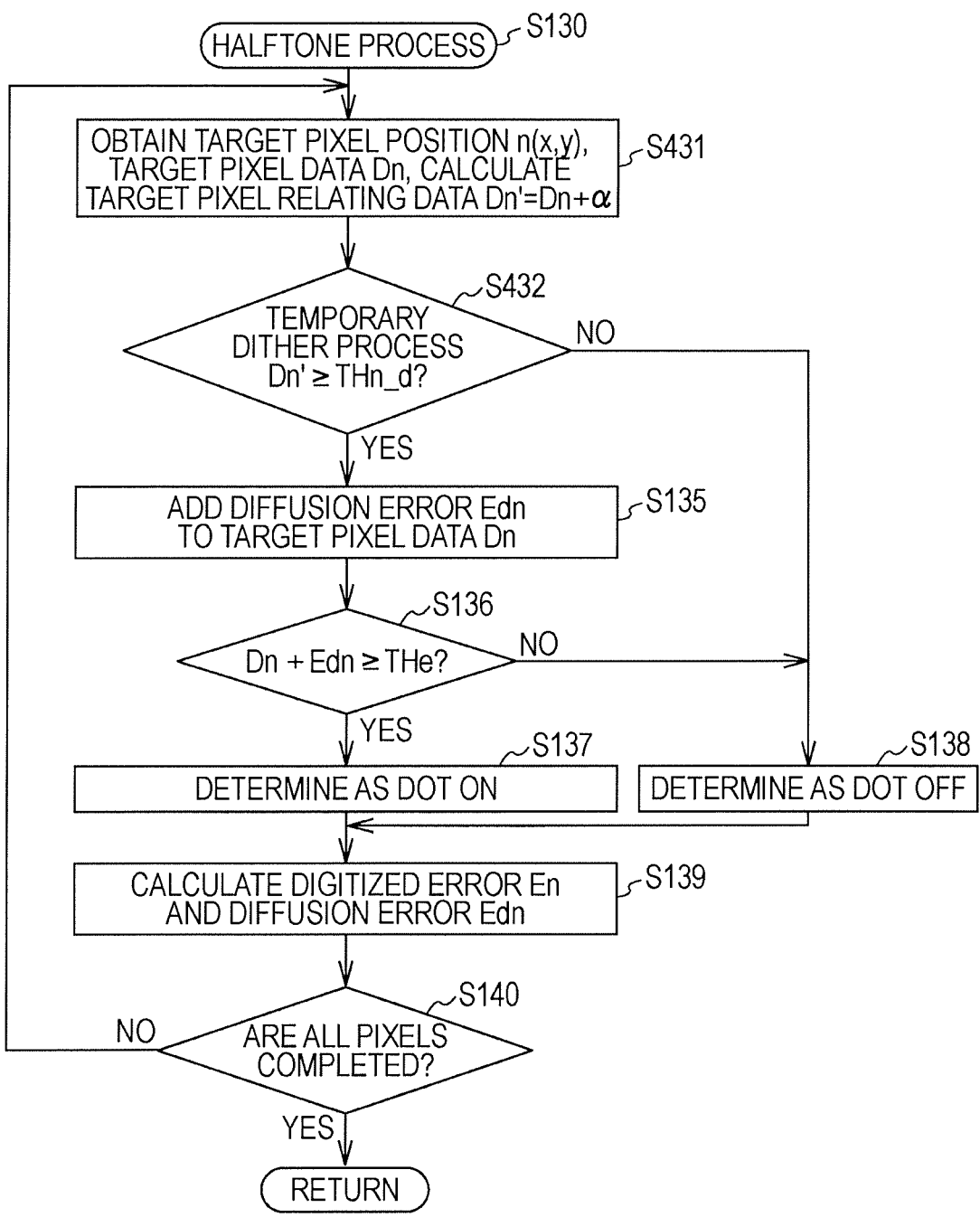
FIG. 11 is a flowchart illustrating a modified example of an algorithm for a halftone process according to a sixth embodiment.

Further, FIG. 11 illustrates another configuration of the halftone process in which the correlatively with respect to the dot generation pattern based on the dither mask 61 is controlled. In FIG. 11, the same processes as in the respective processes of the above described halftone process are given the same numerals. The process as shown in FIG. 11 is different from the process as shown in FIG. 10 in that the threshold THe used for the error diffusion method is not influenced by the result of the temporary dithering process (step S432), and if the related data Dn' is smaller than the threshold THn_d (step S432: NO) in the temporary dithering process, the final dot ON/OFF is determined as the dot ON (step S138). Further, the predetermined value α is set to the positive number.

Thus, in the error diffusion method of steps S135 to S139, the final dot ON pixel is selected only from the pixels of the dot ON in the temporary dithering process. Accordingly, the halftone process result which is closer to the dot generation pattern of the dithering mask 61 can be obtained. Further, in the temporary dithering process, if the related data Dn' is smaller than the threshold THn_d, the processes of steps S135 and S136 can be omitted, and thus, the process can be performed at a high speed.

G Modified Examples

Modified examples according to the above described embodiment will be described hereinafter.

G-1. First Modified Example

In the halftone process according to the above described embodiment, in determination of the dot ON/OFF for every pixel, the temporary dithering process is performed for every pixel, but the temporary dithering process may be performed for pixels of a predetermined range in a batch. That is, a result of the temporary dithering process with respect one pixel may be applied to peripheral pixels thereof. For example, in a region of 3 pixel×3 pixel, the temporary dithering process is performed only with respect to a central pixel thereof, and then, the result may be applied to all the pixels in the corresponding region. Thus, the halftone process can be performed at a high speed. Further, with such a configuration, in the case of a photograph image or the like in which the grayscale variation for every local region is smooth, the printing image quality is not significantly deteriorated.

G-2. Second Modified Example

In the halftone process according to the above described embodiment, by comparing the grayscale value of the target pixel data Dn with a variety of thresholds, the dot ON/OFF determination by means of the temporary dithering method or the error diffusion method is performed. However, the grayscale value of the target pixel data Dn may be converted into a recording rate on the basis of a predetermined conversion rule, and then, the grayscale value of the recording rate may be compared with the variety of thresholds. Here, the recording rate refers to a rate that dots are recorded in the pixels in an arbitrary region. For example, in the printer 20, in a case where images are formed by dots having a plurality of sizes such as large dots or small dots, the grayscale value of the recording rate calculated for every dot size may be compared with the variety of thresholds, on the basis of the grayscale value of the target pixel data Dn.

G-3. Third Modified Example

In the above described embodiment, the error diffusion threshold table 62 performs setting so that the threshold difference ΔTHe is increased as the grayscale value becomes large or small, with respect to the grayscale value of the predetermined range. However, in the error diffusion method, around the grayscale value in which a texture pattern is likely to be generated, the error diffusion threshold table 62 may perform setting so that the dithering method element is particularly increased, that is, the threshold difference ΔTHe is increased. The grayscale value in which the texture pattern is likely to be generated is different according to the characteristic of the printer 20, but generally is a grayscale value in which ink duty becomes 1/N % (N is an integer of 2 or more) or so. Thus, the generation of the texture pattern due to the error diffusion method can be restricted. Further, even in such a case, if the threshold ΔTHe is smoothly changed by stages, the contribution level of the dithering method element and the error diffusion method element can be smoothly changed.

G-4. Fourth Modified Embodiment

The halftone process according to the present invention may employ a different format for every ink color. For example, the printer 20 may change the characteristic of the threshold difference ΔTHe varied according to the grayscale value, according to the ink color. Such a configuration can be realized, for example, in such a manner that the printer 20 stores a plurality of error diffusion threshold tables 62 having different characteristics and changes the error diffusion threshold table 62 used for the halftone process according to the ink color.

Further, a technique of the halftone process may be changed for every ink color. For example, the printer 20 may perform the halftone process as shown in FIG. 8 or FIG. 9, with respect to ink such as yellow which is relatively difficult to be visualized to human eyes in printed matters, and may perform the halftone process as shown in FIG. 3, with respect to the other ink. This is because the printing image quality is hardly influenced even though the dithering method which is inferior to the error diffusion method from the viewpoint of the granularity is employed since the ink which is difficult to be visualized hardly influences the granularity of the printing image quality. Further, thus, the halftone process can be performed at a high speed.

In addition, with respect to dark ink having a color material of a relatively dark density (in the present embodiment, cyan ink, magenta ink) and light ink having a color material of a relatively light density (in the present embodiment, light cyan ink, light magenta ink), the halftone process as shown in FIG. 8 or FIG. 9 may be performed, and may be switched into the dot ON/OFF determination by means of only the dithering method element (steps S232 to S234) from a low grayscale value in the dark ink, compared with the light ink. Thus, the halftone process can be performed at a high speed, due to an insignificant influence to the printing image quality. This is because, since it is less likely that only the dark ink is individually used among the dark ink and the light ink, the granularity of the dot the light ink which is difficult to be visualized is relatively improved by means of the error diffusion method element to thereby increase the improvement effect of the printing image quality.

G-5. Fifth Modified Example

In the halftone process according to the above described embodiment, the threshold value difference ΔTHe is changed according to the grayscale value, but the threshold difference ΔTHe may be a constant value irrespective of the grayscale value. Thus, the halftone process which employs both of the error diffusion method element and the dithering method element can be performed.

G-6. Sixth Modified Example

The above described embodiment, the printer 20 controls the easiness of the dot formation according to the error diffusion method, by changing the threshold THe used for the dot ON/OFF determination of the error diffusion method, and changes the contribution level of the error diffusion method element and the dithering method element in the halftone process, but the control of the easiness of the dot formation according to the error diffusion method is not limited thereto. For example, on the basis of the result of the temporary dithering process, a predetermined value β (β>0) is added to the grayscale value of the target image data Dn to which the error diffusion method is applied, or the predetermined value β is reduced therefrom, and then, the dot ON/OFF may be determined. At this time, in order to correctly reflect the grayscale of the entire image data, the binarization error En can be calculated with the predetermined value β being excluded. In this respect, the predetermined value β may be given as a variable value according to the grayscale value of the input target pixel data Dn. With such a configuration, in a similar way to the case where the threshold THe is changed, the easiness of the dot formation in the error diffusion method can be properly controlled.

G-7. Seventh Modified Example

In the above described embodiment, the printer 20 performs the entire printing process in FIG. 2, but in a case where the printing process is performed in a printing system (printing apparatus in a broad sense) in which the printer is connected to a computer, all or part of the printing process and the halftone process may be performed by means of any one of the computer and the printer.

Hereinbefore, the embodiments of the present invention have been described, among the elements of the above described embodiments of the invention, elements other than elements disclosed in independent claims are additional elements and may be suitably omitted. Further, the present invention is not limited to the above described embodiments, may be realized as a variety of modified embodiments without departing from the spirit of the invention. For example, the invention is not limited to the ink jet printer of a serial type as shown in the above described embodiments, may be applied to a variety of printing apparatuses such as an ink jet line printer and a laser printer. In addition, the invention may be realized as a printing method, a program, a storage medium and so on, in addition to the configuration of the printing apparatus.

What is claimed is:

1. A printing apparatus adapted to perform printing of image data corresponding to a plurality of pixels representing a predetermined image, the printing apparatus comprising:
   an input section through which the image data including data grayscale values of the pixels is input;
   a halftone processing section configured to generate dot data for indicating the presence or absence of formation of a dot in each of the pixels, on the basis of the image data; and
   a printing section configured to perform the printing of the image using the generated dot data,
   the halftone processing section including
      a comparison section configured to compare, for at least one of the pixels, a related grayscale value relating to the data grayscale value of the input image data with a corresponding one of a plurality of thresholds included in a dither mask, and
      an error diffusion section configured to generate the dot data according to an error diffusion method, on the basis of the data grayscale values of the input image data,
      the error diffusion section being configured to control the easiness of the dot formation according to the error diffusion method, on the basis of a comparison result of the comparison section.

2. The printing apparatus according to claim 1, wherein the error diffusion section is configured to control the easiness of the dot formation so that the dot formation according to the error diffusion method is easier to occur in a case where the related grayscale value is equal to or larger than the corresponding one of the thresholds of the dither mask than in a case where the related grayscale value is smaller than the corresponding one of the thresholds of the dither mask.

3. The printing apparatus according to claim 2, wherein the error diffusion section is configured to vary an error diffusion method threshold used to determine the presence or absence of the dot formation in the error diffusion method to control the easiness of the dot formation according to the error diffusion method.

4. The printing apparatus according to claim 2, wherein the error diffusion section is configured to vary a control level for the easiness of the dot formation on the basis of the size of the data grayscale value.

5. The printing apparatus according to claim 4, wherein the error diffusion section is configured to increase the control level for the easiness of the dot formation with respect to high grayscale data which is within a predetermined range in which the data grayscale value is relatively large, among the image data, compared with low grayscale data which is within a predetermined range in which the data grayscale value is relatively small.

6. The printing apparatus according to claim 4, wherein the error diffusion section is configured to vary by stages the control level for the easiness of the dot formation according to the size of the data grayscale value.

7. The printing apparatus according to claim 4, wherein the error diffusion section is configured to control the easiness of the dot formation so that the control level for the easiness of the dot formation increases as the data grayscale value increases at least when the data grayscale value is within a predetermined part of the entire range of the data grayscale value.

8. The printing apparatus according to claim 4, wherein the error diffusion section is configured to stop the control for the easiness of the dot formation in a case where the data grayscale value is within a first range.

9. The printing apparatus according to claim 4, wherein the halftone processing section is configured to stop the generation of the dot data according to the error diffusion method and to generate the dot data according to a dithering method using the comparison result of the comparison section, in a case where the data grayscale value is within a second range.

10. The printing apparatus according to claim 9, wherein the second range is a range having a relatively high data grayscale value in a case where the entire range of the data grayscale value is divided into two ranges.

11. The printing apparatus according to claim 2, wherein the related grayscale value is equal to the data grayscale value.

12. The printing apparatus according to claim 2, wherein the related grayscale value includes a grayscale value obtained by increasing or decreasing the data grayscale value by a predetermined positive value.

13. The printing apparatus according to claim 12, wherein the related grayscale value is a grayscale value obtained by increasing the data grayscale value by the predetermined positive value, and the error diffusion section is configured to control the easiness of the dot formation in a case where the related grayscale value is smaller than the corresponding one of the thresholds of the dither mask as the comparison result of the comparison section, so that the dot formation is hard to occur or does not occur.

14. The printing apparatus according to claim 1, wherein the dither mask has a blue noise characteristic.

15. A method of generating printing data of image data corresponding to a plurality of pixels representing a predetermined image, comprising:

inputting the image data including data grayscale values of the pixels;

comparing, for at least one of the pixels, a related grayscale value relating to the data grayscale value of the input image data with a corresponding one of a plurality of thresholds included in a dither mask; and generating dot data for indicating the presence or absence of formation of a dot in each of the pixels according to an error diffusion method on the basis of the data grayscale values of the image data, while controlling the easiness of the dot formation on the basis of a comparison result.

16. A non-transitory computer usable medium storing a printing data generating program for generating printing data of image data corresponding to a plurality of pixels representing a predetermined image with the printing data generating program causing and to a computer to execute functions of:

inputting the image data including data grayscale values of the pixels;

comparing, for at least one of the pixels, a related grayscale value relating to the data grayscale value of the input image data with a corresponding one of a plurality of thresholds included in a dither mask; and generating dot data for indicating the presence or absence of formation of a dot in each of the pixels according to an error diffusion method on the basis of the data grayscale values of the image data, while controlling the easiness of the dot formation on the basis of a comparison result.

* * * * *